United States Patent [19]

Iwasawa et al.

[11] Patent Number: 5,067,068
[45] Date of Patent: Nov. 19, 1991

[54] METHOD FOR CONVERTING AN ITERATIVE LOOP OF A SOURCE PROGRAM INTO PARELLELLY EXECUTABLE OBJECT PROGRAM PORTIONS

[75] Inventors: Kyoko Iwasawa, Tokyo; Yoshikazu Tanaka, Omiya; Shizuo Gotou, Machida, all of Japan

[73] Assignee: Hitachi, Ltd., Tokyo, Japan

[21] Appl. No.: 201,772

[22] Filed: Jun. 2, 1988

[30] Foreign Application Priority Data

Jun. 5, 1987 [JP] Japan .................. 62-139729

[51] Int. Cl.[5] .................. G06F 9/38; G06F 9/45
[52] U.S. Cl. .................. 395/650; 364/280.4; 364/263; 364/262.4; 364/280; 364/973; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,085,450 | 4/1978 | Bhalchandra | 364/900 |
| 4,145,733 | 3/1979 | Misunas | 364/200 |
| 4,152,763 | 5/1979 | Shimoi | 364/200 |
| 4,215,416 | 7/1980 | Muramatsu | 364/736 |
| 4,270,181 | 5/1981 | Tanakura et al. | 364/736 |
| 4,309,756 | 1/1982 | Beckler | 364/300 |
| 4,365,311 | 12/1982 | Fukunaga | 364/900 |
| 4,365,312 | 12/1982 | Nakano | 364/900 |
| 4,430,707 | 2/1984 | Kim | 364/200 |
| 4,466,061 | 8/1984 | DeSantis | 364/200 |
| 4,468,736 | 8/1984 | DeSantis | 364/200 |
| 4,484,272 | 11/1984 | Green | 364/200 |
| 4,564,901 | 1/1986 | Tomlinson | 364/200 |
| 4,594,655 | 6/1986 | Hao | 364/200 |
| 4,642,764 | 2/1987 | Auslander et al. | 364/300 |
| 4,667,290 | 5/1987 | Goss et al. | 364/300 |
| 4,763,255 | 8/1988 | Hopkins | 364/200 |
| 4,802,091 | 1/1989 | Corke | 364/200 |
| 4,825,360 | 4/1989 | Knight | 364/200 |
| 4,833,599 | 5/1989 | Colwell | 364/200 |
| 4,833,606 | 5/1989 | Iwasawa | 364/200 |
| 4,943,912 | 7/1990 | Aoyama | 364/200 |

Primary Examiner—Thomas C. Lee
Assistant Examiner—Eric Coleman
Attorney, Agent, or Firm—Fay, Sharpe, Beall, Fagan, Minnich & McKee

[57] ABSTRACT

In a compiling method, whether a variable (induction variable) recurrsively defined during loop iteration is included in an iteratively executed loop portion of a source program is detected. If such a variable is detected, a computation program portion for calculating a value of the variable which the variable should have during loop iteration of an arbitrary loop iteration number is generated. A plurality of parallely executable object program portions each for executing one of a plurality of processing to be executed during loop iteration of a respective loop iteration number of the loop portion is generated. Each of the object program portions includes a portion for executing the generated computation program portion for a respective loop iteration number to calculate a value of the variable for that loop iteration number.

4 Claims, 11 Drawing Sheets

```
      IA = 1                  ~20
      DO  30  I = 1, N        ~21
         IB = I               ~22
         DO  20  J = 1, I     ~23
            B(IB) = A(IA)     ~24
            IA  = IA + 1      ~25
 20         IB  = IB + IBD    ~26
 30   CONTINUE                ~27
```

```
        IA = 1              ~20
        DO  30  I = 1,N     ~21
           IB = I           ~22
           DO  20  J = 1,I  ~23
              B(IB) = A(IA) ~24
              IA   = IA + 1 ~25
  20          IB   = IB + IBD ~26
  30    CONTINUE            ~27
```

```
         IA = 1                  ~20
         DO 30  I = 1,N          ~21
            IB = I               ~22
            IA = 1 + I*(I-1)/2   ~109
            DO 20  I = 1,I       ~23
               B(IB) = A(IA)     ~24
               IA = IA + 1       ~25
  20           IB = IB + IBD     ~25
  30     CONTINUE                ~27
```

PROGRAM EXECUTED BY PROCESSOR i

PROGRAM TO BE EXECUTED BY PROCESSOR i

METHOD FOR CONVERTING AN ITERATIVE LOOP OF A SOURCE PROGRAM INTO PARELLELLY EXECUTABLE OBJECT PROGRAM PORTIONS

BACKGROUND OF THE INVENTION

The present invention relates to a compiling method for converting a source program including in an iterative loop such as a DO loop of FORTRAN a variable which is recurrsively defined during loop iteration into a plurality of parallelly executable object program portions.

A parallel computer having a plurality of parallelly operated processors has been being studied and developed from the old mainly by colleges and enterprises in the U.S. For such a parallel processing system, a FORTRAN type language which has been being used for a conventional serial execution type computer is frequently adopted as an input language. CRAY X-MP by CRAY Corp., multiprocessor by IBM Corp. and Alliant FX/8 by Alliant Corp. have been known. The CRAY X-MP is discussed in "A Data-Flow Approach to Multitasking on CRAY X-MP", ACM-0-89791-174-1-12/85-0/07, pp 107-114. The IBM multiprocessor is discussed in "Microtasking on IBM Multiprocessors", IBM Journal, Research and Development, Vol. 30, No. 6, November 1986, pp 574-582. The Alliant FX/8 is discussed in "The Architecture of The Alliant FX/8 Computer", CH2285-5/86/0000/0390, 1986 IEEE, pp 390-393.

In order to write a source program which runs on a parallel computer in FORTRAN language, one of the following two methods may be used. In one method, a separate program is prepared for each processor. In the other method, one program is divided by a processing system into a plurality of source program portions with processors. It has been known that the latter method imparts a lower load to a user who writes a program. When the processing system divides one FORTRAN program into each processor, a loop in the program which has a high execution rate may be parallelly executed for each repetition.

```
DO 10        I = 1, N  ⎫
  .                    ⎪
  .                    ⎪
  .                    ⎪
J = J + 1              ⎪
  .                    ⎬ (1)
  .                    ⎪
X = X * C              ⎪
  .                    ⎪
  .                    ⎪
  .                    ⎪
10 CONTINUE            ⎭
```

In such a program, the program portion (1) when I=1, the program portion (1) when I=2, ..., the program portion (1) when I=N are parallelly executed by separate processors.

A problem which arises in this case is a variable which is recurrsively defined for each loop iteration, such as J or X in (1). This variable is called an induction variable.

In the FORTRAN source program, a frequency of the calculation defined in this manner is very high. For the conventional serial computer, a technique to improve an execution performance has been studied. For example, "Principles of Compiler Design" by A. V. Aho J. D. Ullman, pp. 466-471 discusses the induction variable elimination.

This technique is effective to a serial execution type computer but it is not effective to a parallel processing computer.

There is no reference known which discusses a method to parallelly execute the induction variable and it is supposed that one processor serially executes it or data are communicated among the processors to execute it. However, this type of processing does not improve the execution efficiency.

In a program shown in; FIGS. 8A, 8B, if DO 10 loop or DO 30 loop is parallelly executed for each predetermined number of loop repetition, the following problem arises. A statement 17 is a definition of J. For an I-th iteration of the loop, the value of J calculated in the (I−1)th iteration of the loop is used. For the parallel execution by the plurality of processors, the value of J must be transferred from the processor which executes the (I−1)th iteration to the processor which executes the I-th iteration. Accordingly, the parallel computer without communication means among the processors cannot parallelly execute, and even if it has communication means, the parallel operation is lost because of waiting time for the previous execution. In addition, a time for data communication is required. The same is true for R in a statement 18 and IA in a statement 24. The recurrsive definition which defines a new value by using the immediately previously defined value is a big factor of lowering the execution efficiency in the parallel processing as opposed to the serial processing.

SUMMARY OF THE INVENTION

It is an object of the present invention to provide a compiling method for converting a portion of source program including a definition statement of a recurrsive induction variable which frequently appears in a FORTRAN program into parallelly executable object program portions.

In accordance with the present invention, whether a variable which is recurrsively defined in loop iteration (induction variable) is included in a loop portion or not is examined, and if such a variable is detected, a computation program portion which calculates the value of the variable to be calculated for any loop iteration is generated, and a plurality of object program portions each for executing one of a plurality of processings for different loop iterations in the loop portion are generated. Each of the object program portions executes the computation program for the corresponding loop iteration to calculate the value of the variables to be calculated for the corresponding loop iteration.

BRIEF DESCRIPTION OF THE DRAWINGS

FIGS. 9A and 9B show programs generated by applying initial values to the source programs shown in FIGS. 8A and 8B, FIGS. 10A and 10B show programs generated by transforming the define statements of the source program shown in FIGS. 9A and 9B, and FIGS. 11A and 11B show FORTRAN programs generated from the source programs shown in FIGS. 10A and 10B, respectively, which correspond to object programs to be executed by an i-th processor.

DESCRIPTION OF THE PREFERRED EMBODIMENTS

Figure 1:
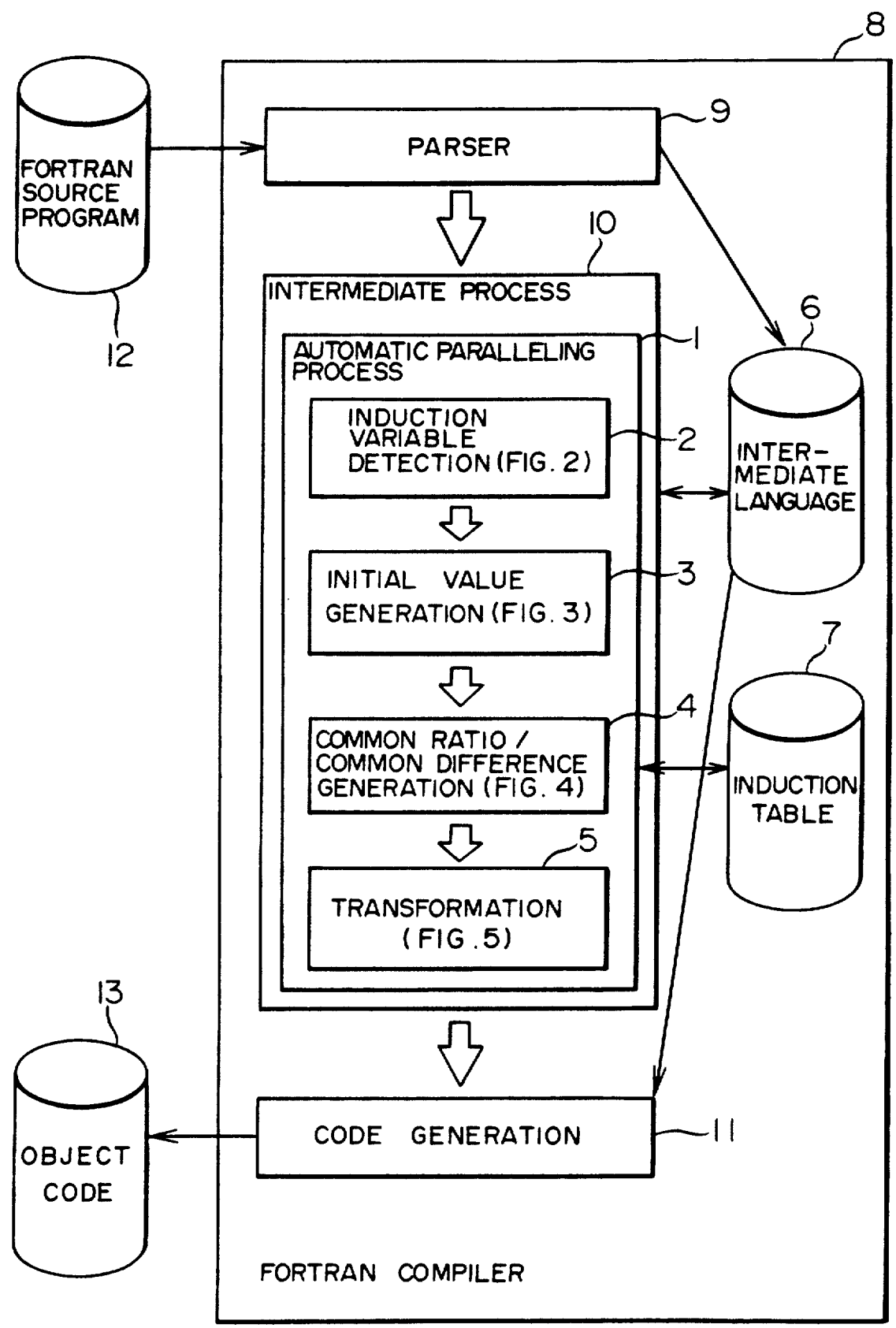
FIG. 1 shows a flow chart of a compiling process of the present invention.

FIG. 1 shows a process flow of a compiler program of the present invention. In FIG. 1, a parse processing part 9 converts a FORTRAN source program 12 to an intermediate language 6. An intermediate processing part 10 modifies the intermediate language 6 by optimizing and parallelling it. A code generation processing part 11 generates an object code 13 from the intermediate language modified by the intermediate processing part 10. The present invention is characterized by the intermediate processing part 10. It enhances an execution efficiency by increasing parallelly executable portions of the object code 7.

The processing is briefly described below.

The induction variable detection process 2, the initial value generation process 3, the common difference/common ratio generation process 4 and the define statement conversion process 5 act to the induction variable in the loop in the following manner.

In the induction variable detection process 2, the induction variables J and R are detected for the paralleling loop DO 10 of FIG. 8A. The induction variable IA is detected for the paralleling loop DO 30 of FIG. 8B.

In the initial value generation process 3, for J and R of the DO 10 loop of FIG. 8A, a formula to define the initial values is generated by using new variables $J_0$ and $R_0$ which hold the values of J and R before the process enters the loop. For the paralleling loop DO 30 of FIG. 9B, the initial value 1 of IA is detected.

In the common difference/common ratio generation process 4, a common difference of 5 is detected for J, and a common ratio of A is detected for R, of the DO 10 loop of FIG. 8A. For IA of the DO 30 loop of FIG. 8B, a common difference of $I*(I+1)/2$ is generated.

The statement conversion process 5 converts the statement to one which uses a number of loop iteration and a loop-invariant variable. For J of the DO 10 loop of FIG. 8A, $J=J+5$ is substituted by $J=J_0+5*I$ of the statement 107 of FIG. 10A, and for R, it is substituted by $R=R_0*A**I$ of the statement 108 of FIG. 10A. For IA of the DO 30 loop, $IA=1+I*(I-1)/2$ of the statement 109 of FIG. 10A is inserted.

In this manner, a plurality of object programs which eliminate the recurrsive property of the induction variable and execute the processing of the DO loop including the processing of the substituted statement for different numbers of loop iterations, are generated.

Figure 11A:
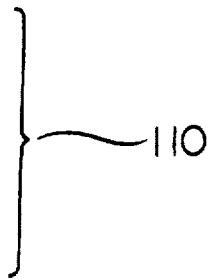
Figure 11B:
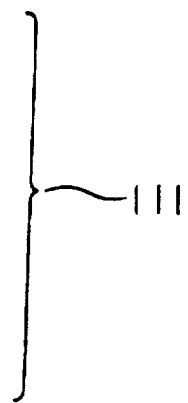

FIGS. 11A and 11B show those object programs generated above which are to be executed by a processor i for the DO 10 loop and the DO 30 loop.

Figure 2:
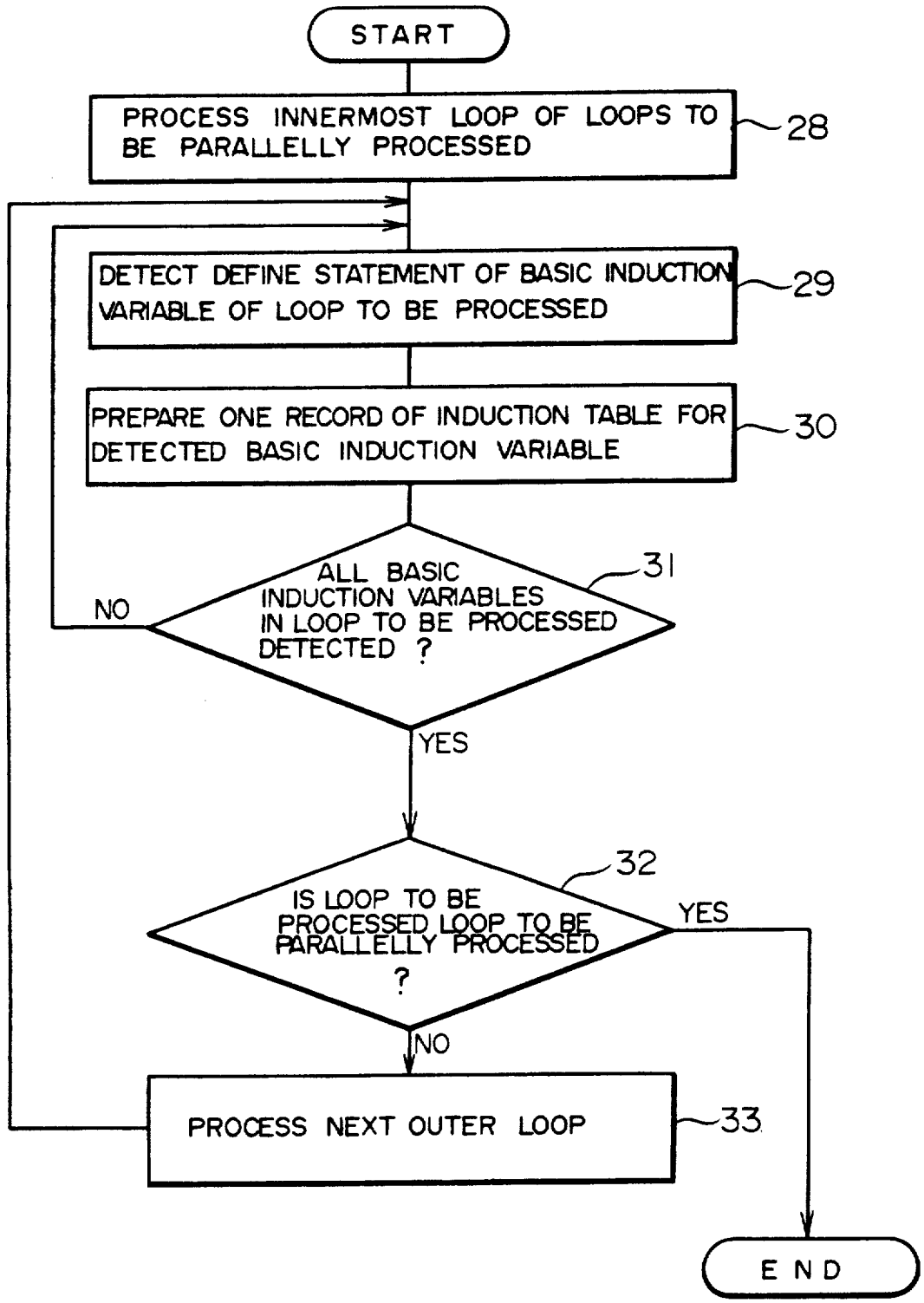
FIG. 2 shows a flow chart of an induction variable detection process.
Figure 6:
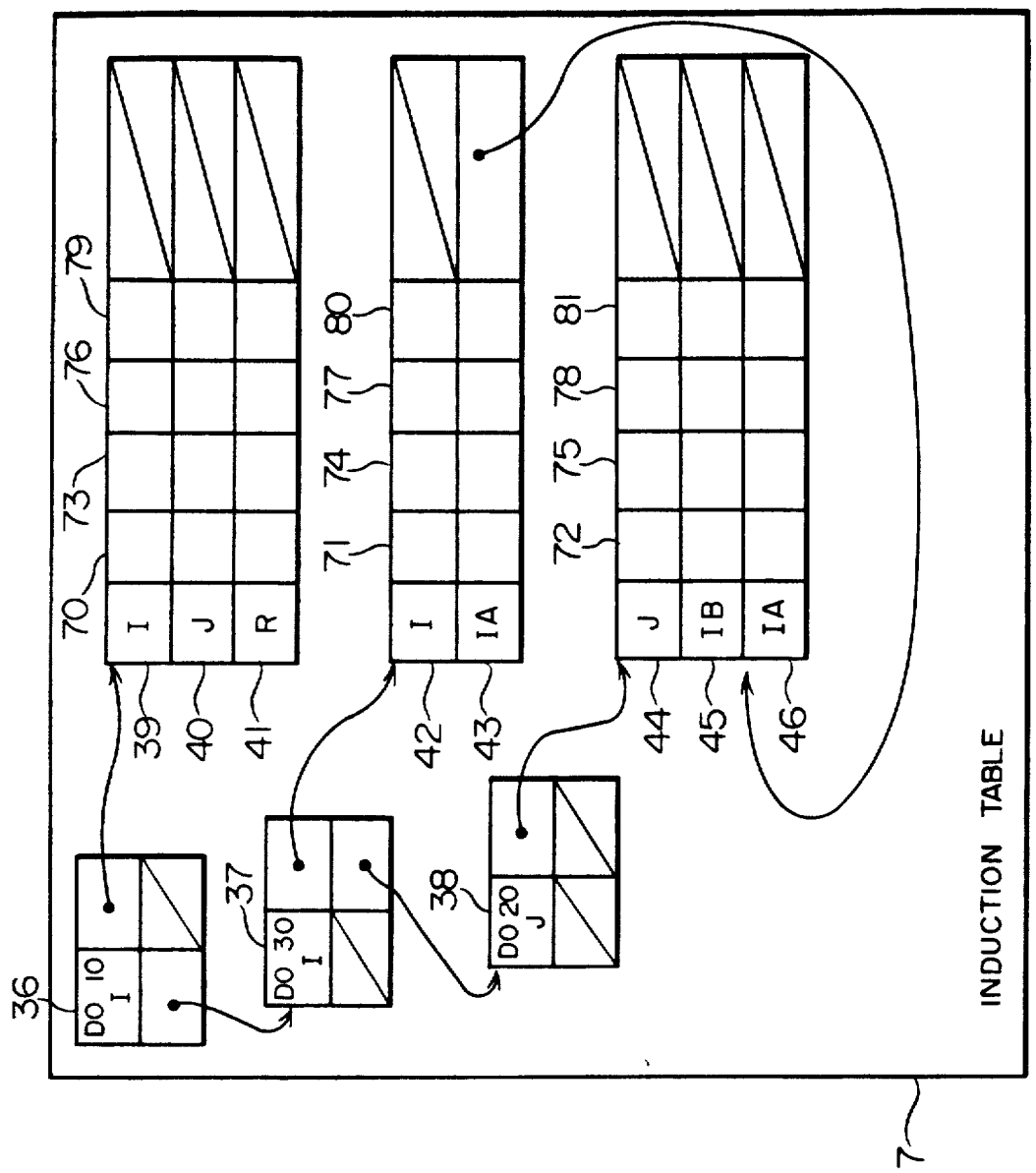
FIG. 6 shows an induction table.

In FIG. 1, the induction variable detection process 2 receives the intermediate language 6 derived by parsing the source program and operates as shown by the flow chart of FIG. 2 to prepare the induction table 7 shown in FIG. 6.

In the induction variable detection process 2, the loops to be parallelly processed are sequentially processed starting from the innermost loop until the loop to be parallelly processed is reached. The loop to be parallelly processed may be designated by a user or may be automatically detected by a compiler. It has been known that a higher efficiency is attained when a more outer loop is selected for the loop to be parallelly processed.

In a step 28 of FIG. 2, an initial value of a loop for which the induction variable is to be detected is set. The loop to be processed is expanded outward one by one in a step 33 until a decision step 32 decides YES. In a step 29, a loop-invariant variable is analyzed to detect a basic induction variable in the loop. In a step 30, one record of the induction table 7 is prepared for the detected basic induction variable. All basic induction variables are detected through a decision step 31 to prepare records of the table 7.

In FIG. 8A, J is detected from the statement 17, R is detected from the statement 18, and I is detected from the statement 16 as the basic induction variables, and I record 39, J record 40 and R record 41 are prepared in the table 7 of FIG. 6. In FIG. 8B, IA is detected from the statement 25 of the innermost loop DO 10, IB is detected from the statement 26, and J is detected from the statement 23 as the basic induction variables, and J record 44, IB record 45 and IA record 46 are prepared in the table 7 of FIG. 6. Then, IA is detected from the statement 25 of the next outer DO 30 loop and I is detected from the statement 21 as the basic induction variables, and I record 42 and IA record 43 are prepared in the table 7 of FIG. 6.

Figure 7:
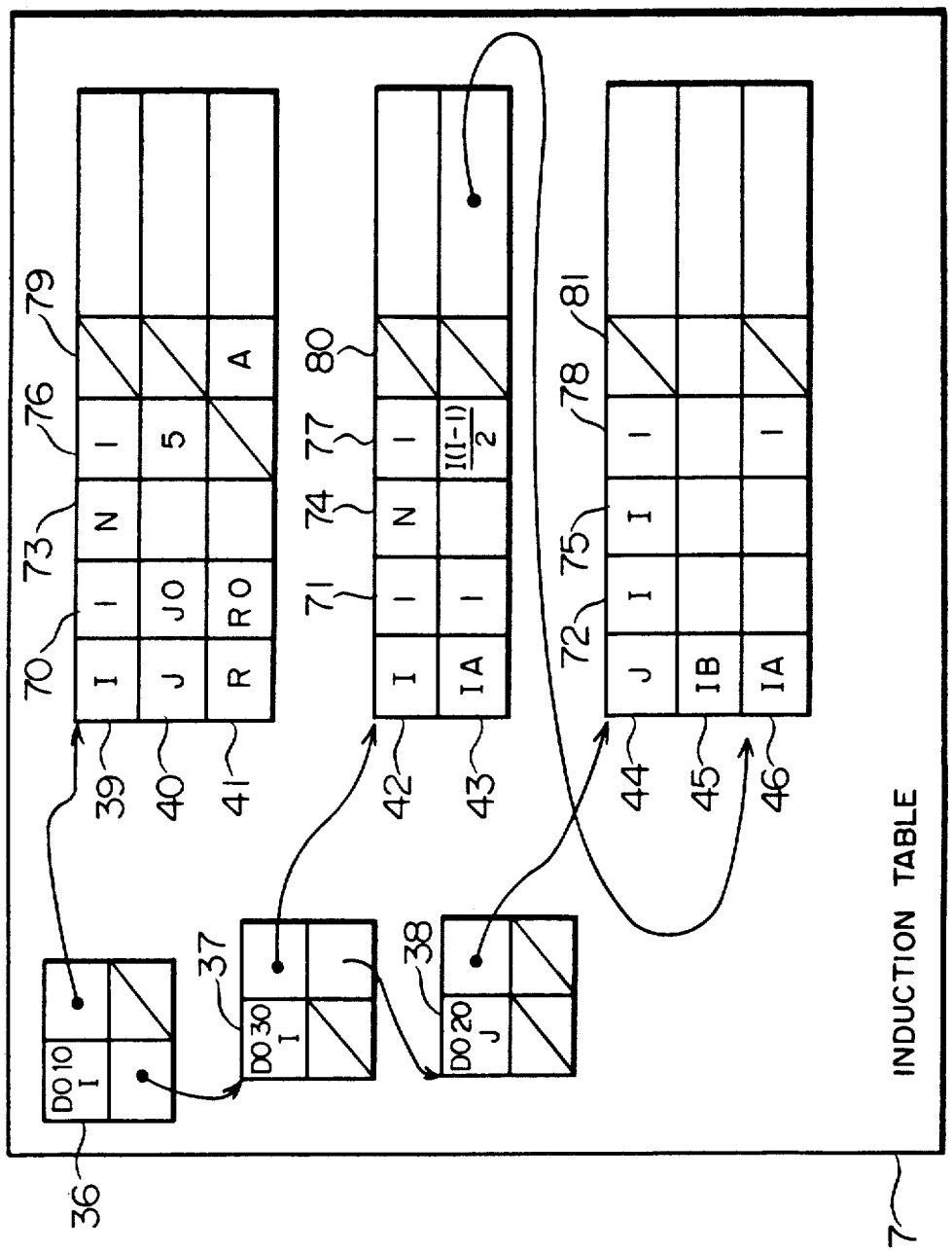
FIG. 7 shows a content of the induction table for source programs of FIGS. 8A and 8B, FIGS. 8A and 8B show two example source programs used in the embodiment.

In the initial value generation step 2, an initial value which is a loop-invariant variable that does not change in the loop is detected for each of the registered basic induction variables based on the induction table of FIG. 6 to update the induction table as shown in FIG. 7. A code for calculating them may be generated as required.

Figure 3:
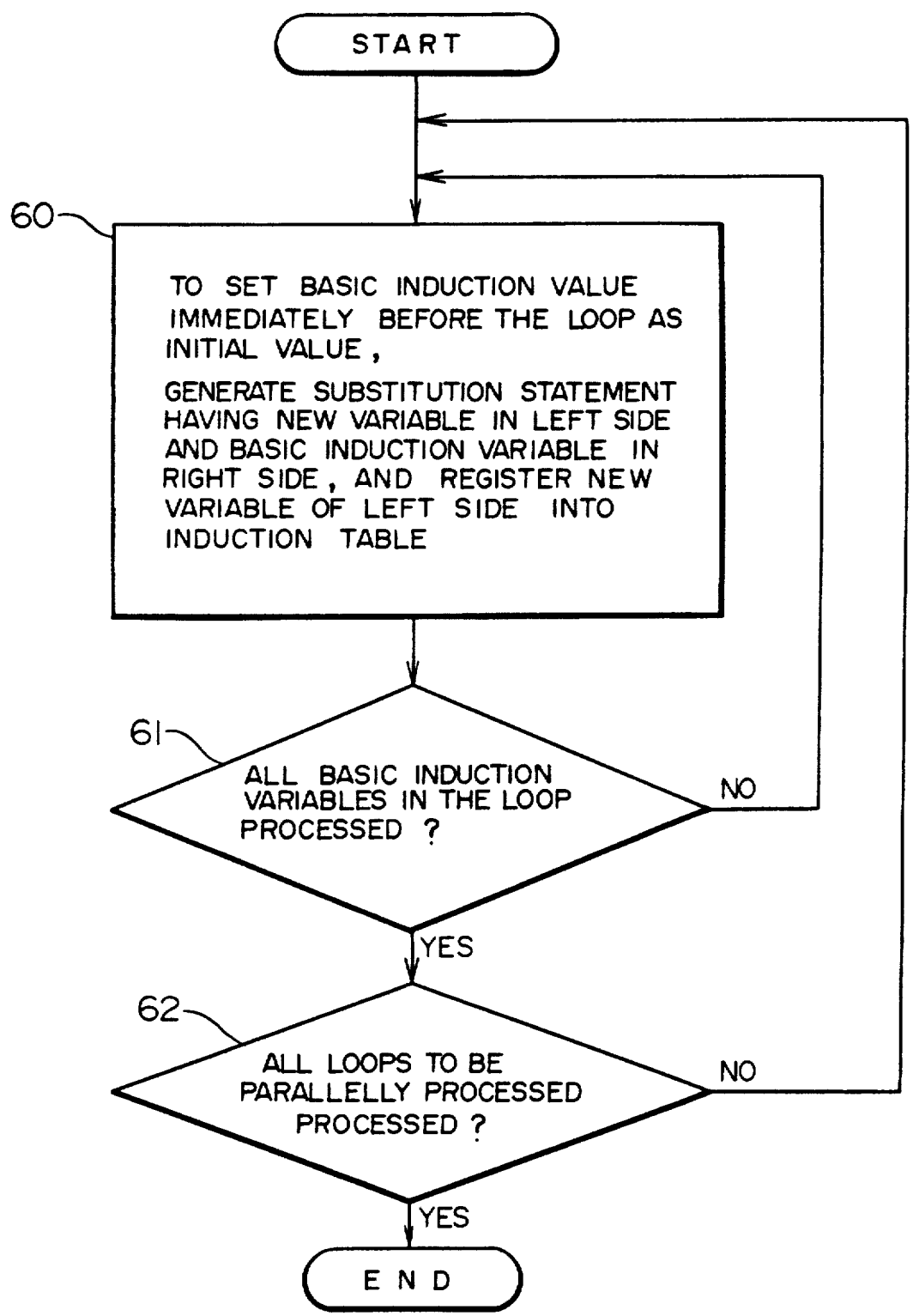
FIG. 3 shows a flow chart of an initial value generation process.

The processing is briefly explained with reference to a flow chart shown in FIG. 3.

In a step 60, a substitution statement is prepared to set an initial value prior to the execution of the corresponding loop of the basic induction variable, and it is inserted immediately before the loop. The substitution statement which includes a new variable in a left side and the basic induction variable in a right side may be omitted when the initial value is a constant and the constant is used as the initial value. The new variable in the right side is stored as the initial value in the induction table 7 of FIG. 6. The above step is repeated for each of the basic induction variables in the loop through a decision step 61. The step is repeated for each of the loop to be parallelly processed through a decision step 62.

In FIG. 8A, the induction variable of the DO 10 loop is processed by the record 36 of the DO 10 loop of FIG. 6. In the step 60 of FIG. 3, the initial value 1 is detected for the control variable I, and in the step 63, "1" is recorded into a field 70 of the record 39 of the induction table 7 shown in FIG. 7. For J of the record 40 of the induction table 7 of FIG. 6, since the initial value is a constant and not determined, a substitution statement 14 shown in FIG. 9A is generated and inserted, and the newly introduced variable $J_0$ in the left side is registered in the field 70 of the record 40 of the induction table 7 as shown by the record 40 of FIG. 7. For R of the record 41 of FIG. 6, a substitution statement 15 shown in FIG. 9A is generated and inserted in a step 64, and the newly introduced variable $R_0$ is registered in the field 70 of the record 41 of the induction table 7 as shown in the record 41 of FIG. 7.

In FIG. 8B, the initial value 1 is detected for the loop control variable I, and it is registered in a step 60 into a field 71 of the record 42 as shown in the record 42 of FIG. 7. For IA, the definition of the statement 20 is detected in the step 60 and it is registered in the field 71 of the record 43 as shown in the record 43 of FIG. 7. FIGS. 8A and 8B correspond to FIGS. 9A and 9B, respectively.

In the common difference/common ratio generation step 4, a common difference or common ratio is detected for the induction variable based on the updated induction table 7.

Figure 4:
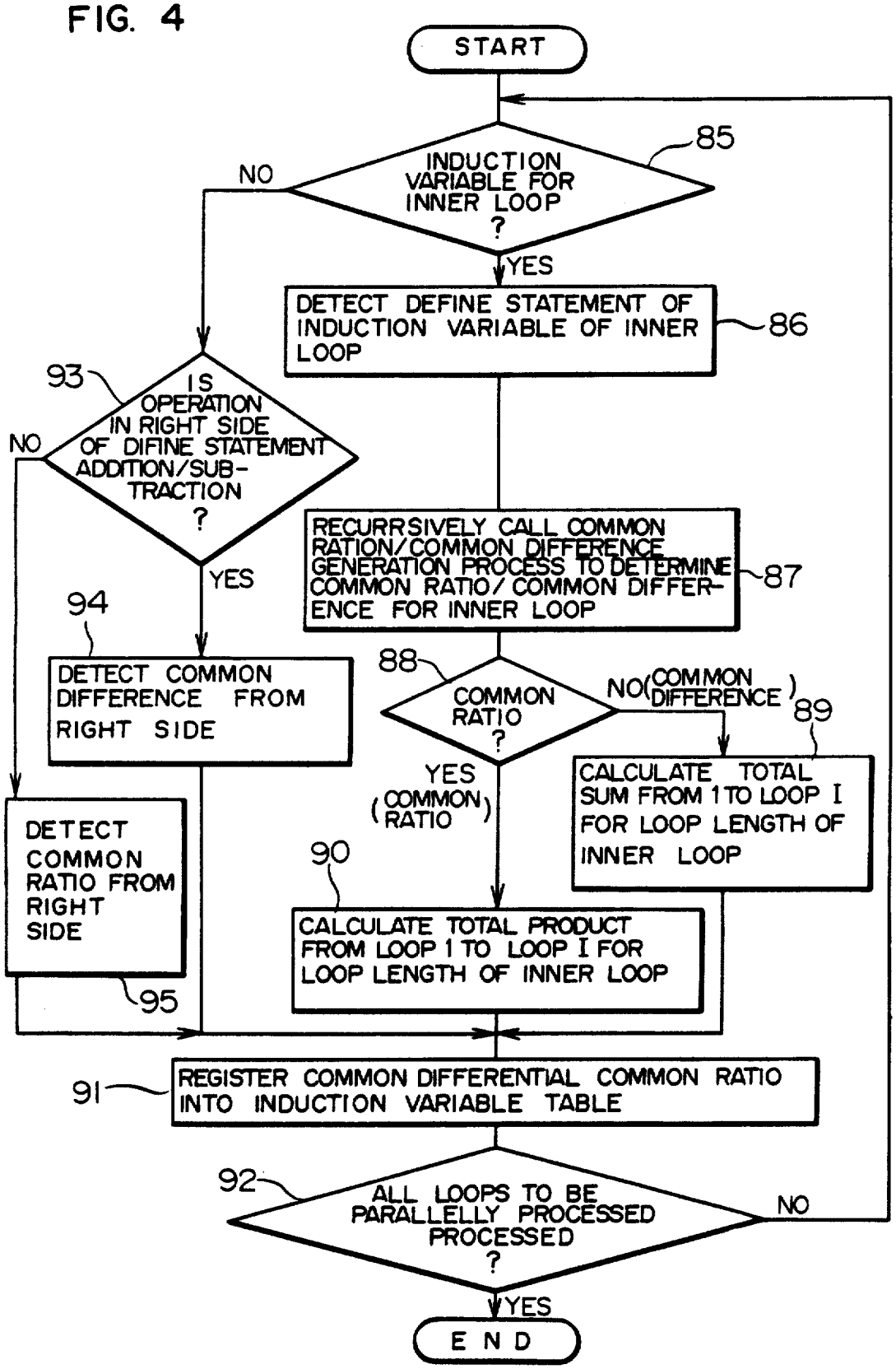
FIG. 4 shows a flow chart of a common ratio and common difference generation process.

FIG. 4 shows a flow chart of the processing. In a decision step 85, whether the basic induction variable is registered as a basic induction variable in the induction table 7 even for the innermost loop of the loops to be parallelly processed is checked. If it has no connection with the innermost loop, which one of the common ratio and the common difference is required is determined by an operator in the right side of the define statement in a step 93, they are detected in steps 95 and 94, respectively, and are registered in the induction table 7 in a step 91.

If the basic induction variable is valid even for the innermost loop, the define statement in the innermost loop is detected in a step 86, and this step is recurrsively called in a step 87 to determine one of the common ratio and the common difference in the innermost loop. Based on this, a total product or total sum in the innermost loop when the loop 1 to I have been executed is calculated in a step 89 or 90, and it is stored in a step 91 into the induction table 7 as the common difference or common ratio of the loop. The above steps are repeated for each of the loops to be parallelly processed through a decision step 92.

In FIG. 9A, the DO 10 loop is first processed. Since the DO 10 loop has no inner loop, the process proceeds to the step 93 from the decision step 85. For J, since the operator for the right side indicates addition, the common difference "5" is detected in the step 94 and it is registered in the field 76 of the record 40 of the induction table 7. Nil is registered in the field 79. For R, since the operator for the right side indicates multiplication, the common difference A is detected in the step 95, and nil is registered in the field 76 of the record 41 of the induction table and A is registered in the field 79.

In FIG. 9B, since the induction variable is valid for the innermost loop (DO 20) for IA, the process proceeds to the step 86 from the decision step 85. In the step 86, the statement 25 in the DO 20 loop is detected. In the step 86, the common difference/common ratio generation process 4 is recurrsively called. Since the DO 20 loop now has no inner loop, the common difference "I" is detected as was done for J of the DO 10 loop, and "1" is recorded in the field 78 of the record 46 of the induction table and nil is recorded in the field 81, and the process returns. Since the field 78 contains "1" (common difference), the process proceeds to the step 89. In the step 89, since the loop length of the inner loop is I (record 44), a total sum for I iterations of the inner loop having the common difference "1" is calculated. In the present example, since I is the control variable of the DO 30 loop, the total sum for the loops 1 to I is $I^* (I-1)/2$, which is the common difference of IA. It is registered in the field 77 of the induction table 7, and nil is registered in the field 80. In this manner, the common difference or common ratio of the induction variables J, R, IA of the loops to be parallelly processed is determined. In the induction table shown in FIG. 7, blank fields are not necessary and they are not filled out.

Finally, the define statement is converted to a statement which uses the common ratio/common difference and the number of loop iterations to eliminate the dependency an a plurality of numbers of iterations in the induction variables.

Figure 5:
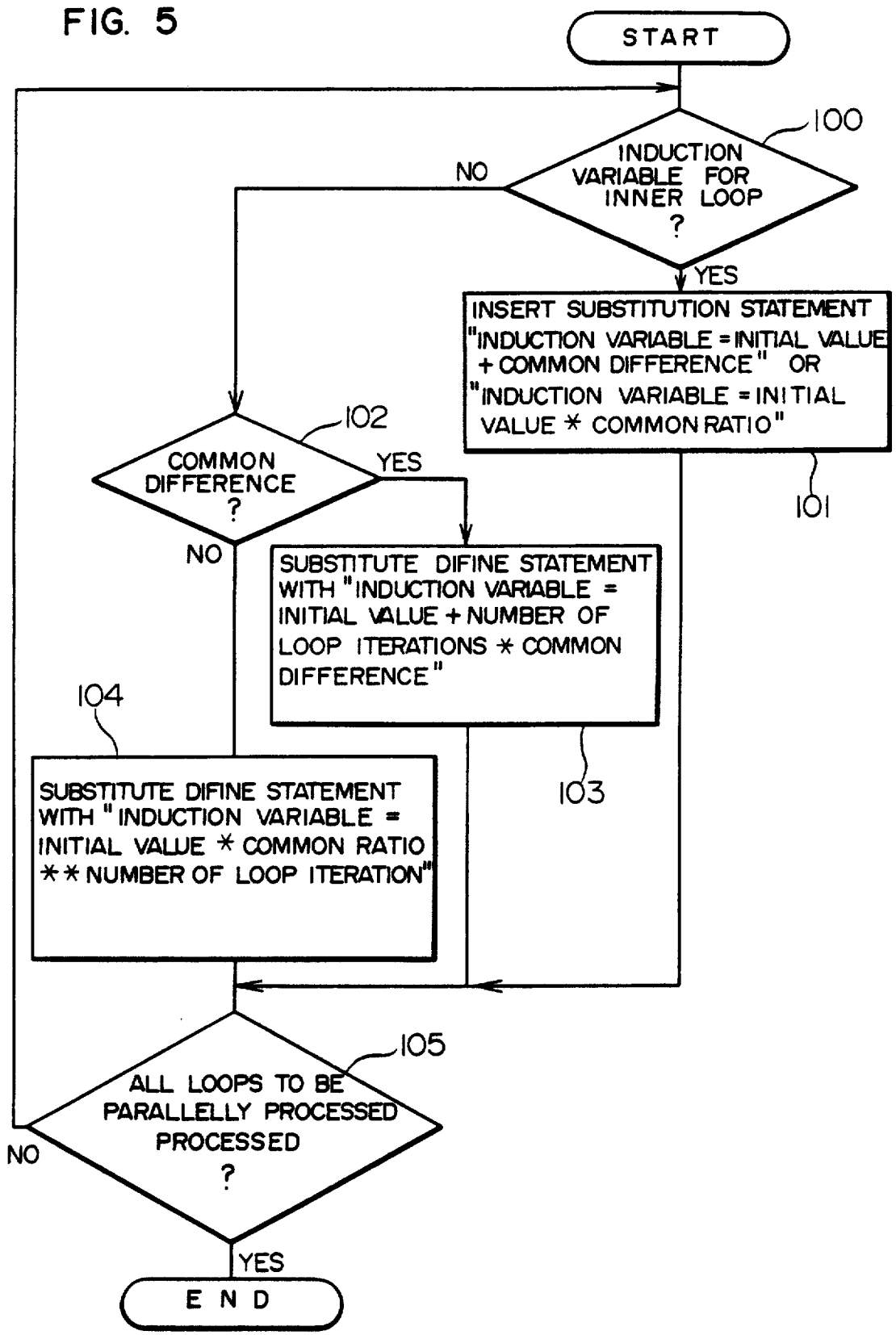
FIG. 5 shows a flow chart of a define statement transform process.

FIG. 5 shows a process flow of the statement transform process 5 based on the induction table of FIG. 7. The source programs of FIGS. 9A and 9B are converted as shown in FIGS. 10A and 10B, respectively.

In a decision step 100, whether the basic induction variable is registered in the induction table 7 as a basic induction variable for the inner loop of the loops to be parallelly processed is checked. If it is registered for the inner loop, the definition statement should not be deleted and in a step 101, a statement "Induction variable — initial value + Common difference" or "Induction variable = Initial value* Common ratio" is inserted at the beginning of the loops to be parallelly processed to eliminate loop carried dependence of the loop. The define statement in the inner loop is left as it is.

If the basic induction variable is not registered for the inner loop, a decision step 102 is executed, and the define statement for the basic induction variable is substituted by "Induction variable = Initial value + Number of loop iterations * Common difference" is a step 103, and by "Induction variable = initial value* Common ratio*Number of loop iterations" in a step 104.

In FIG. 9A, the DO 10 loop is first processed. Since there is no inner loop, the process proceeds to the step 102 from the decision step 100. For the induction variable J, the statement 17 in FIG. 9A is substituted by the statement 107 in FIG. 10A in the step 103, and for the induction variable R, the statement 18 of FIG. 9A is substituted by the statement 108 of FIG. 10A in the step 104.

In FIG. 9B, since the induction variable IA is valid for the inner loop, the process proceeds to the step 101 from the decision step 100. In the step 101, the statement 110 is inserted between the statements 22 and 23 of FIG. 9B, as shown in FIG. 10B.

By converting the programs of FIGS. 9A and 9B to those of FIGS. 10A and 10B, independent parallel execution is attained for each iteration of the DO 10 loop and the DO 30 loop. Since there is no dependency on the number of loop iterations, the parallel processing is attained by a parallel computer having no communication among the processors.

The compiler then decomposes the loops to be parallelly processed of the program shown in FIGS. 10A and 10B. For each of the processors which are parallelly operated, an object program which executes the programs 110 and 111 of FIGS. 11A and 11B is generated. They can be independently and parallelly executed.

In accordance with the present invention, the source program portion which includes the define statement of the induction variable which is recurrsively defined in the loop iteration and which frequently appears in the FORTRAN program is converted to parallelly executable object program portions.

Accordingly, the parallel execution is attained with a machine having no communication means among the parallelly operated processors, and the overhead by the communication is reduced in the machine having the communication means. In this manner, the object code having a high execution performance suitable for the parallel machine can be generated.

In the above embodiment of the present invention, the calculation formula is generated based on the common ratio or common difference corresponding to the recurrsively defined define statement of the induction variable, although the present invention is not limited thereto and includes various modifications without departing from the scope of the claims.

We claim:

1. A method for operating a data processor to compile a loop portion of a source program into a plurality of simultaneously executable object program portions for respective execution by a plurality of parallel processors, each said processor being assigned loop iterations of said loop portion, comprising the steps of:
   detecting whether said loop portion, stored in a first storage area of the data processor, includes a variable recursively defined during loop iteration;
   producing, into a second storage area of the data processor, a computation program portion, when said recursively defined variable is detected, for calculating a value of the recursively defined variable for an arbitrary loop iteration number; and,
   generating, into a third storage area of the data processor, a plurality of simultaneously executable object program portions, each said object program portion comprising one of a plurality of respective loop iterations of the loop portion, wherein each of said plurality of simultaneously executable object program portions includes a portion for executing the produced computation program portion for a respective loop iteration number to calculate a value of the recursively defined variable.

2. The compiling method according to claim 1 wherein the step of producing a computation program portion includes a step of generating, as said computation program, a program portion for calculating the value of said recursively defined variable for a loop iteration number in accordance with a calculation formula which depends on the loop iteration number, the calculation formula converting additions to combinations of multiplications and additions.

3. The compiling method according to claim 1 wherein the step of producing a computation program portion includes the steps of:
   detecting whether said variable is a basic induction variable defined by a value of said variable in a preceding loop iteration or a loop-invariant variable which does not vary in value during lop iteration; and
   generating, when said variable is detected as a basic induction variable, a program portion as said computation program portion, for calculating a value of said variable for a loop iteration number by a calculation formula which depends on an initial value of said variable, the loop iteration number and a value of said loop-invariant variable.

4. The compiling method according to claim 1 wherein the step of producing a computation program portion includes a step of generating, when said loop portion is an outer loop portion having an inner loop iteration portion in an outer portion thereof, and when said variable is contained in said inner loop portion, a program portion as said computation program portion for calculating a value of said variable for a particular loop iteration number of said outer loop portion depending on a total loop iteration number of said inner loop portion by which said inner loop should have been iterated when said outer loop has been iterated to the particular loop iteration number of the outer loop portion.

* * * * *

UNITED STATES PATENT AND TRADEMARK OFFICE
CERTIFICATE OF CORRECTION

PATENT NO. : 5,067,068
DATED : November 19, 1991
INVENTOR(S) : Kyoko Iwasawa, et al.

It is certified that error appears in the above-identified patent and that said Letters Patent is hereby corrected as shown below:

Title Page: In the title, please delete "PARELLELLY" and insert therefor --PARALLELLY--.

In the Claims: Claim 3, column 8, line 18, delete "lop" and insert therefor --loop--.

Signed and Sealed this

Second Day of March, 1993

Attest:

STEPHEN G. KUNIN

*Attesting Officer*   Acting Commissioner of Patents and Trademarks